United States Patent
Khandekar et al.

(10) Patent No.: US 12,452,700 B2
(45) Date of Patent: Oct. 21, 2025

(54) SETTING SYSTEM AND SETTING METHOD FOR SETTING BASE STATION DEVICE

(71) Applicant: RAKUTEN SYMPHONY, INC., Tokyo (JP)

(72) Inventors: Sandesh Khandekar, Tokyo (JP); Manish Kumar, Tokyo (JP); Singh Abhishek, Tokyo (JP); Sushil Rawat, Tokyo (JP); Rahul Atri, Singapore (SG); Kunal Khanwilkar, Singapore (SG)

(73) Assignee: RAKUTEN SYMPHONY, INC., Tokyo (JP)

( * ) Notice: Subject to any disclaimer, the term of this patent is extended or adjusted under 35 U.S.C. 154(b) by 400 days.

(21) Appl. No.: 17/758,963

(22) PCT Filed: Sep. 25, 2020

(86) PCT No.: PCT/IB2020/058980
§ 371 (c)(1),
(2) Date: May 21, 2023

(87) PCT Pub. No.: WO2022/064255
PCT Pub. Date: Mar. 31, 2022

(65) Prior Publication Data
US 2023/0292147 A1    Sep. 14, 2023

(51) Int. Cl.
*H04W 24/02*    (2009.01)

(52) U.S. Cl.
CPC ................. *H04W 24/02* (2013.01)

(58) Field of Classification Search
CPC .................................... H04W 24/02
See application file for complete search history.

(56) References Cited

PUBLICATIONS

3GPP, "3GPP TS 36.101 V12.24.0", France, Dec. 2019, 784pp.

*Primary Examiner* — Gbemileke J Onamuti
(74) *Attorney, Agent, or Firm* — HAUPTMAN HAM, LLP

(57) ABSTRACT

An OSS generates second identification information from first identification information, and generates setting information of a low power base station device based on the second identification information while reflecting position information. When verification of the first identification information is successful, the OSS transmits third identification information of a security GW and fourth identification information of an EMS to the low power base station device. The EMS receives a power on notification from the low power base station device via an IPsec tunnel established at the security GW. The OSS identifies the second identification information from the first identification information included in the power on notification, and writes the setting information identified from the second identification information to the low power base station device.

4 Claims, 6 Drawing Sheets

SETTING SYSTEM AND SETTING METHOD FOR SETTING BASE STATION DEVICE

RELATED APPLICATIONS

The present application is a National Phase of International Application No. PCT/IB2020/058980, filed Sep. 25, 2020.

TECHNICAL FIELD

The present invention relates to a setting technique, and more particularly, to a setting system and a setting method for setting a base station device.

BACKGROUND ART

In a communication system such as Long-Term Evolution (LTE), a plurality of base station devices are installed, and a terminal device is connected to any of the base station devices to execute communication (see, for example, Non Patent Literature 1).

Non Patent Literature

[Non Patent Literature 1] 3GPP, "3GPP TS 36.101 V12.24.0", FRANCE, 2019-12

SUMMARY OF INVENTION

Technical Problem

In mobile communication, an improvement in transmission speed is required, but the transmission speed tends to decrease indoors. In order to improve a transmission speed in such a situation, it is necessary to increase signal strength or improve communication quality. In the same manner as in other wireless communication systems, when a transmitting device and a receiving device are brought close to each other, signal strength and communication quality are improved. A home eNodeB (FEMTO CELL) (hereinafter, referred to as a "low power base station device") is a base station device that uses low electric power and can be installed by a user himself or herself. The low power base station device is connected to a network of a network operator by normal Internet Protocol (IP) connection. The introduction of the low power base station device increases the signal strength, which hence increases the utilization efficiency of frequencies, prolongs the time of driving using a battery, and improves the transmission speed. Setting for such a low power base station device is desirably simple.

The present invention has been made in view of such problems, and an object of the present invention is to provide a technique for simplifying setting for a low power base station device.

Solution to Problem

In order to solve the above problems, a setting system according to an aspect of the present invention includes a business support system, an operation support system, and an element management system placed in a mobile network operator's network, a staging server placed outside the mobile network operator's network, and a gateway placed at a boundary between the mobile network operator's network and the outside. The business support system receives first identification information written in a base station device to be shipped and position information of a place where the base station device is installed; the operation support system generates second identification information from the first identification information received in the business support system and generates setting information of the base station device based on the second identification information while reflecting the position information received in the business support system; when the base station device is installed in the place of the position information, the staging server receives the first identification information from the base station device; when verification of the first identification information received in the staging server is successful, the operation support system transmits third identification information of the gateway and fourth identification information of the element management system to the base station device via the staging server; the gateway establishes an IPsec tunnel with the base station device that has received the third identification information from the operation support system; the element management system receives from the base station device via the IPsec tunnel established at the gateway, a power on notification issued when the base station device is powered on and including the first identification information; and the operation support system identifies the second identification information from the first identification information included in the power on notification received by the element management system, identifies the setting information from the second identification information, and writes the setting information in the base station device.

Another aspect of the present invention is a setting method. This method is a setting method in a setting system including a business support system, an operation support system, and an element management system placed in a mobile network operator's network; a staging server placed outside the mobile network operator's network; and a gateway placed at a boundary between the mobile network operator's network and the outside, and includes the steps of the business support system receiving first identification information written in a base station device to be shipped and position information of a place where the base station device is installed; the operation support system generating second identification information from the first identification information received in the business support system and generating setting information of the base station device based on the second identification information while reflecting the position information received in the business support system; when the base station device is installed in the place of the position information, the staging server receiving the first identification information from the base station device; when verification of the first identification information received in the staging server is successful, the operation support system transmitting third identification information of the gateway and fourth identification information of the element management system to the base station device via the staging server; the gateway establishing an IPsec tunnel with the base station device that has received the third identification information from the operation support system; the element management system receiving from the base station device via the IPsec tunnel established at the gateway, a power on notification issued when the base station device is powered on and including the first identification information; and the operation support system identifying the second identification information from the first identification information included in the power on notification received by the element management system, identifying the setting information from the second identification information, and writing the setting information in the base station device.

Arbitrary combinations of the above-described constituents, and expressions of the present invention which are converted among method, device, system, computer program, recording medium having the computer program recorded, and the like are also effective as aspects of the present invention.

Advantageous Effects of Invention

According to the present invention, setting for a low power base station device can be simplified.

DESCRIPTION OF EMBODIMENTS

Figure 1:
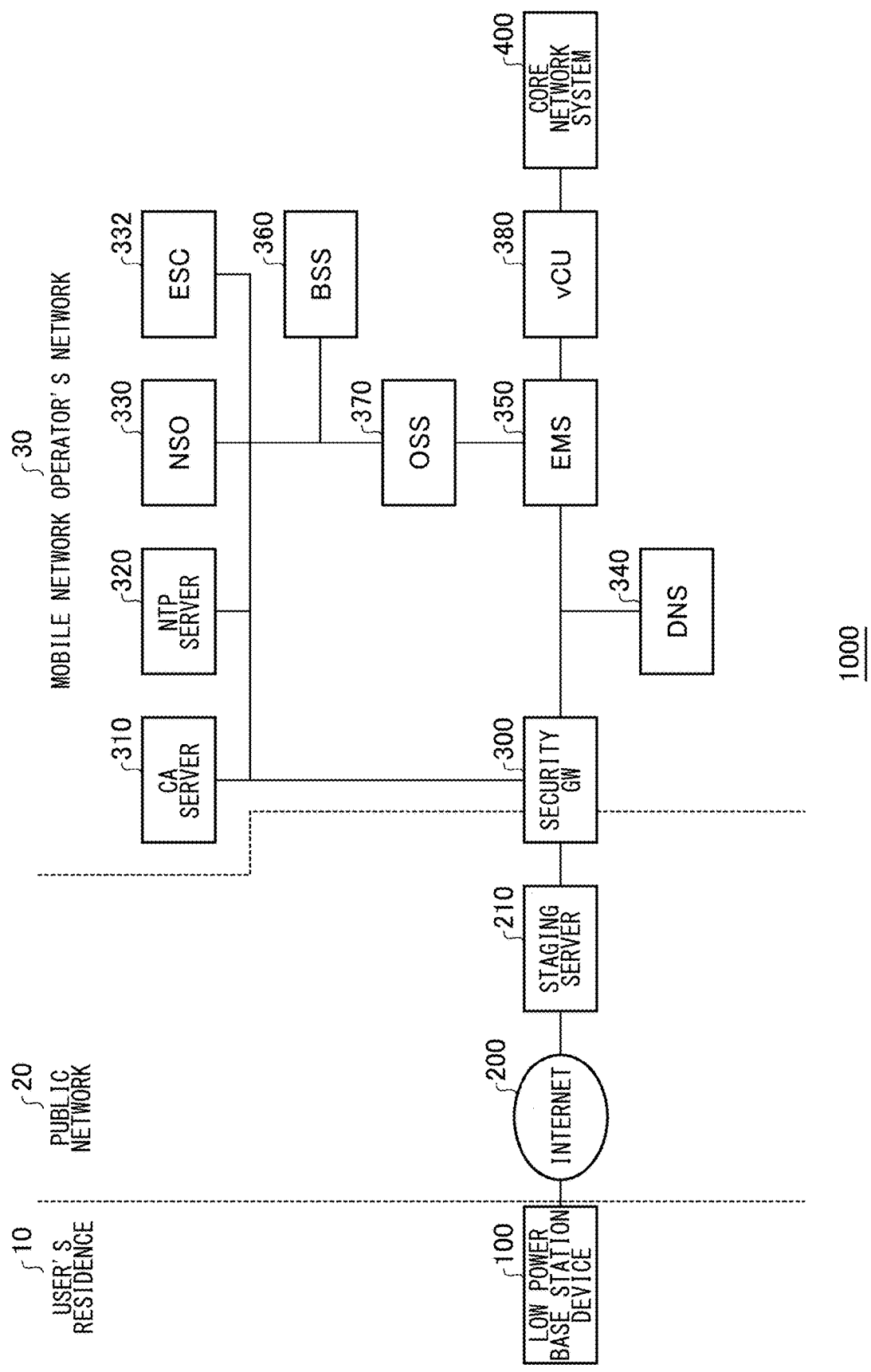
FIG. 1 is a diagram illustrating a configuration of a communication system according to an embodiment.

This example relates to a setting system that executes setting of a low power base station device when the low power base station device is installed in a communication system such as LTE in which a base station device and a terminal device communicate with each other. The low power base station device provides short-range coverage, and is therefore introduced into a communication system, particularly, to extend indoor coverage. Owing to the small coverage, the low power base station device is realized at low power and low cost. The low power base station device is used to fill a coverage hole and to improve a network service capability. Similarly to a base station device, such a low power base station device is used according to the Radio Act of Japan. The Radio Act of Japan defines, for example, that a low power base station device should be deployed at an address registered in advance, and defines radiatable transmission power. In order to comply with the Radio Act of Japan, a worker of a mobile network operator visits a place of a registered address, installs a low power base station device at the place, and sets up the low power base station device. In such a situation, labor of the worker for installing and setting up the low power base station device increases, and a period until the low power base station device is available for use increases. Therefore, it is required to simplify the setting for the low power base station device.

The setting system of this example sends a low power base station device to a registered address of a user and allows the user to install the low power base station device, thereby eliminating the need for a worker to visit the place of the address. In addition, based on identification information uniquely assigned to the low power base station device (hereinafter, referred to as "first identification information") before the low power base station device is sent, the setting system generates identification information to be used for setting (hereinafter, referred to as "second identification information"), and then generates setting information associated with the second identification information. In the setting information, setting contents of a physical layer conforming to the Radio Act of Japan are indicated, and information on surrounding base station devices and low power base station devices for realizing handover in an installed place is also indicated. When the user installs and powers on the low power base station device, a notification for notifying powering on (hereinafter, referred to as a "power on notification") is transmitted from the low power base station device. Upon receiving the power on notification, the setting system acquires the second identification information from the first identification information included in the power on notification, and acquires the setting information from the second identification information. The setting system transmits the setting information to the low power base station device, and the low power base station device executes setting according to the received setting information.

FIG. 1 illustrates a configuration of a communication system 1000. The communication system 1000 includes a low power base station device 100, the Internet 200, a staging server 210, a security gateway (GW) 300, a CA server 310, a network time protocol (NTP) server 320, a network services orchestrator (NSO) 330, an elastic services controller (ESC) 332, a domain name system (DNS) 340, an element management system (EMS) 350, a business support system (BSS) 360, an operation support system (OSS) 370, a virtualized central unit (vCU) 380, and a core network system 400. Here, the low power base station device 100 is placed in a user's residence 10; the Internet 200 and the staging server 210 are placed in a public network 20; and the security GW 300 to the vCU 380 and the core network system 400 are placed in a mobile network operator's network 30. The staging server 210 and the security GW 300 to the vCU 380 are included in the setting system.

The communication system 1000 is a mobile communication system such as LTE or 5G, and executes radio communication between a base station device (not illustrated) and a mobile terminal (not illustrated). The mobile terminal is a mobile communication terminal operated by a user who has made a contract with a mobile network operator (MNO), and is, for example, a smartphone or a tablet terminal.

The low power base station device 100 is a base station device in which transmission power (radiation power) of radio waves is smaller than that of a base station device (not illustrated), and is also referred to as a home eNodeB. A cell formed by the low power base station device 100 is called a femtocell. Similarly to a base station device, the low power base station device 100 executes wireless communication by being wirelessly connected to a mobile terminal. In addition, the low power base station device 100 is connected to the Internet 200 included in the public network 20. Here, the low power base station device 100 may be connected to the Internet 200 via a BBR (BroadBand Router) which is not illustrated. The BBR is a communication device that connects a LAN in the user's residence 10 and an external WAN, and includes a function of a line terminating equipment. A home gateway (HGW) may be used instead of the BBR. Although FIG. 1 illustrates a low power base station device 100, the communication system 1000 may include a plurality of low power base station devices 100 installed in a plurality of user's residences 10.

The staging server 210 is connected to the Internet 200, and the staging server 210 is also connected to the security GW 300 of the mobile network operator's network 30. The staging server 210 is included in the public network 20 and executes mediation processing for connecting the low power base station device 100 placed outside the mobile network operator's network 30 to the mobile network operator's network 30.

The security GW 300 is placed at a boundary between the mobile network operator's network 30 and the public network 20. The security GW 300 relays communication data between a device/system in the mobile network operator's network 30 and a device/system of the user's residence 10 or the public network 20. Although details will be described later, the low power base station device 100 in the user's residence 10 and the security GW 300 are connected to a virtual private network (VPN) using known IPsec, and communication data is transmitted and received via the VPN tunnel.

The CA server 310 sets up the VPN tunnel by a certificate of the mobile network operator. The NTP server 320 is a server that executes a protocol for transmitting and receiving information of the current time. The NSO 330 is an automation platform for automating services in conventional and virtualized networks. The ESC 332 is a virtual network function manager (VNFM) that manages life cycle of virtual network function (VNF). The DNS 340 manages association (forward lookup and reverse lookup) between a domain name used for an address such as a host name and an Internet Protocol (IP) address.

The EMS 350 is a computer system that manages setting information of the low power base station device 100. The BSS 360 supports business operations for mobile network operators. For example, the BSS 360 manages customer information and billing information, and supports practical operations such as service application, opening processing, billing, and inquiry handling. The OSS 370 is a computer system that supports operation of the entire communication system 1000 including the low power base station device 100.

The vCU 380 provides a radio access network (RAN) function. The core network system 400 is a computer system that provides a core network function of LTE or 5G. For example, the core network system 400 may include functions such as unified data management (UDM), access and mobility management function (AMF), and session management function (SMF).

Hereinafter, in such communication system 1000, a setting processing for newly installing the low power base station device 100 in a user's residence 10 in which the low power base station device 100 is not installed will be described in the order of (1) processing before installation of low power base station device 100, (2) processing from installation of low power base station device 100 to transmission of power on notification of low power base station device 100, (3) processing after transmitting power on notification of low power base station device 100, and (4) modification.

(1) Processing Before Installation of Low Power Base Station Device 100

Figure 2:
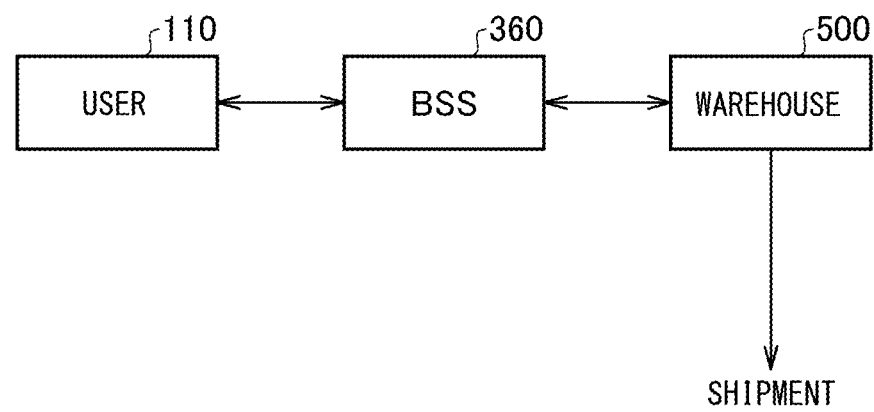
FIG. 2 is a diagram illustrating another configuration of the communication system of FIG. 1.

FIG. 2 shows another configuration of the communication system 1000. A user 110 is a person who lives in the user's residence 10 of FIG. 1. In addition, the user 110 may subscribe to a service of a mobile network operator that operates the communication system 1000 and use a mobile terminal. A warehouse 500 is a warehouse for storing low power base station devices 100 before shipment. The low power base station devices 100 before shipment each have a media access control (MAC) address and a serial number written therein during factory production, and the MAC address and the serial number of each low power base station device 100 are managed in the warehouse 500.

Figure 3:
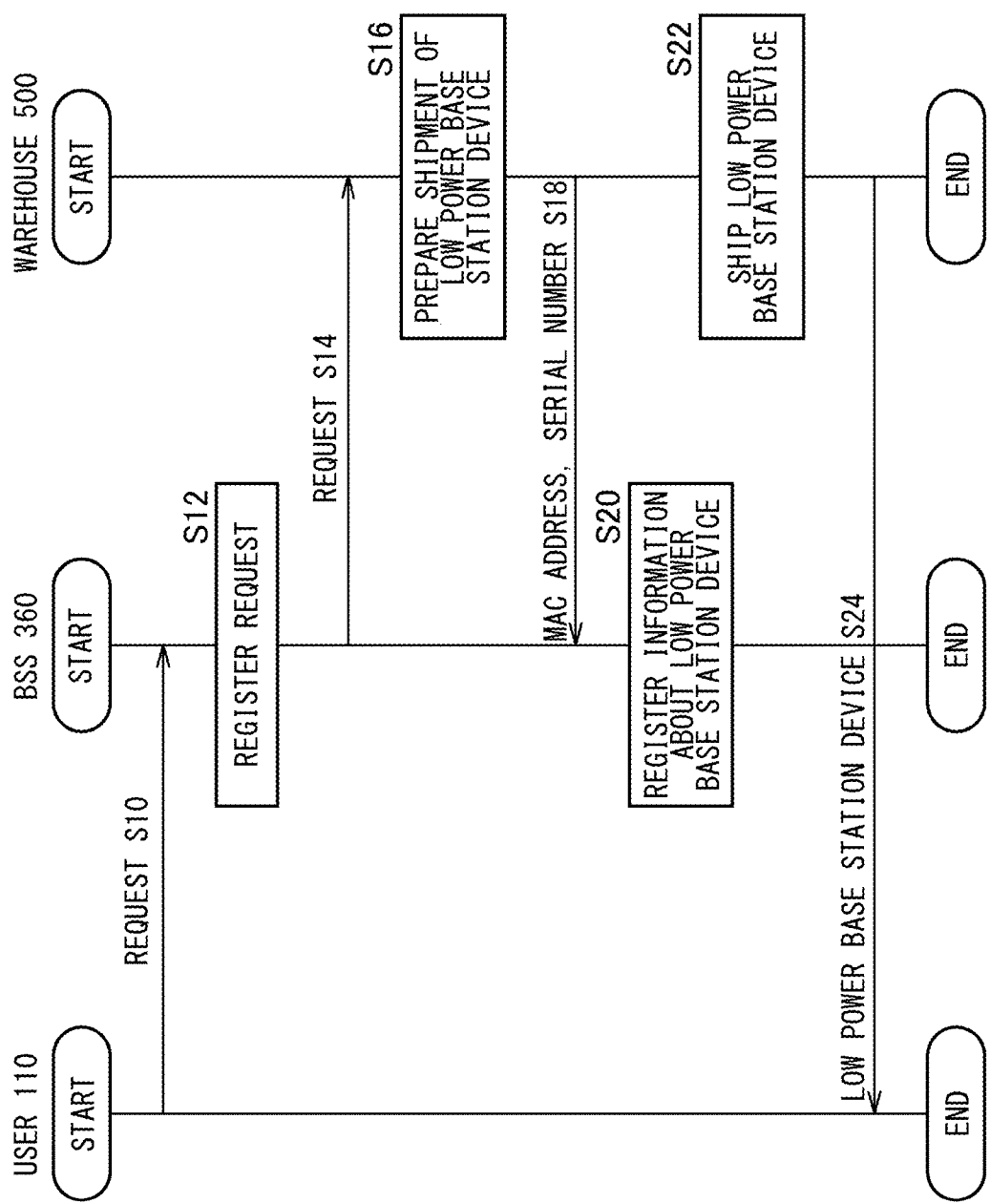
FIG. 3 is a sequence diagram illustrating a shipping procedure by the communication system of FIG. 2.

In the following, FIG. 3 is also used to describe the processing. FIG. 3 is a sequence diagram illustrating a shipping procedure by the communication system 1000. When the user 110 who uses a mobile terminal at the user's residence 10 recognizes deterioration of a communication state with a base station device, the user 110 contacts a customer care agent of the BSS 360. The deterioration of the communication state with the base station device occurs, for example, due to a decrease in received power of a signal from the base station device. The customer care agent of the BSS 360 suggests that the user 110 use the low power base station device 100 to solve the problem. In response to this, the user 110 requests the customer care agent of the BSS 360 to install the low power base station device 100 (S10).

The BSS 360 registers the request from the user 110 (S12). The BSS 360 also receives an address of the user's residence 10 of the user 110, that is, position information. The BSS 360 transmits the address of the user's residence 10 and the request for installation of the low power base station device 100 to a computer of the warehouse 500 (hereinafter, this is also referred to as the "warehouse 500") (S14). The warehouse 500 prepares a low power base station device 100 to be shipped to the address of the user's residence 10 (S16). The warehouse 500 transmits a MAC address and a serial number written in the low power base station device 100 to be shipped to the BSS 360 (S18). The BSS 360 receives the MAC address and the serial number written in the low power base station device 100 to be shipped. The BSS 360 registers information about the low power base station device 100 including the MAC address and the serial number written in the low power base station device 100 to be shipped, and the address of the place where the low power base station device 100 is to be installed (S20). The warehouse 500 ships the low power base station device 100 to the address of the user 110 (S22), and the low power base station device 100 is then delivered to the user's residence 10 of the user 110 (S24). Return to FIG. 1.

The BSS 360 transmits information about the low power base station device 100 to the OSS 370. The OSS 370 receives information about the low power base station device 100 from the BSS 360. The OSS 370 generates an SARF ID from the MAC address and the serial number in the information about the low power base station device 100. The SARF ID is identification information used in a setting processing of the shipped low power base station device 100. When the MAC address and the serial number are referred to as first identification information, the SARF ID is referred to as second identification information.

The OSS 370 stores a database including information on all the already installed low power base station devices 100 and information on all the already installed base station devices. The database indicates position information of a place where the low power base station device 100 is installed and position information of a place where the base station device is installed. The OSS 370 refers to the database based on the address in the information about the low power base station device 100, thereby acquiring information on the low power base station device 100 or the base station device already installed near the shipped low power base station device 100. The term "near" corresponds to a distance at which a cell at least partially overlapping with a cell formed by the shipped low power base station device 100 can be formed. This is to identify a low power base station device 100 or a base station device that can perform handover with the shipped low power base station device 100. The information on the low power base station device 100 or the base station device may be a specific number (base station specific number). The base station specific number may be, for example, a PCI (Physical Cell ID) or an ECGI (E-UTRAN Cell Global ID).

The OSS 370 generates setting information associated with the SARF ID while including the acquired information. That is, the OSS 370 generates the setting information of the low power base station device 100 based on the SARF ID while reflecting the position information received in the BSS 360. The OSS 370 stores a correspondence relationship between the MAC address and the serial number, and the SARF ID (hereinafter, referred to as a "first correspondence relationship"), and also stores a correspondence relationship between the SARF ID and the setting information (hereinafter, referred to as a "second correspondence relationship").

(2) Processing from Installation of Low Power Base Station Device 100 to Transmission of Power on Notification of Low Power Base Station Device 100

Figure 4:
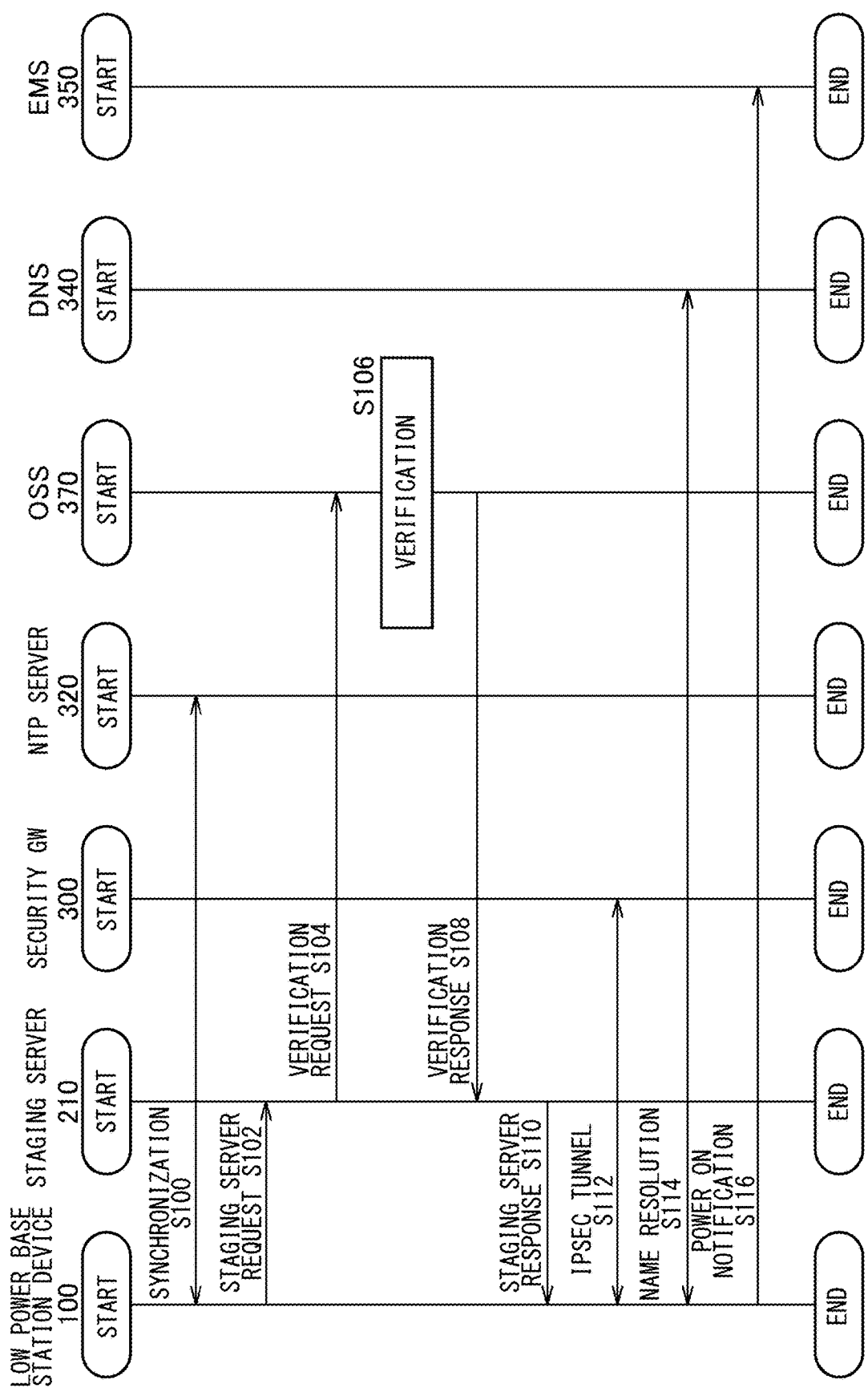
FIG. 4 is a sequence diagram illustrating a transmission procedure of a power on notification by the communication system of FIG. 1.

In the following, FIG. 4 is also used to describe the processing. FIG. 4 is a sequence diagram illustrating a transmission procedure of a power on notification by the communication system 1000. The user 110 who has received the low power base station device 100 installs the low power base station device 100 in the user's residence 10. For example, the low power base station device 100 is connected to the BBR. When a power supply of the low power base station device 100 is turned on, the low power base station device 100 acquires an IP address assigned by the BBR. This allows the low power base station device 100 to communicate with the Internet 200. A fully qualified domain name (FQDN) of the NTP server 320 is written in the low power base station device 100 during manufacturing, and the low power base station device 100 is connected to the NTP server 320 via the Internet 200. The low power base station device 100 is time-synchronized by the NTP server 320 (S100).

An FQDN of the staging server 210 is written in the low power base station device 100 during manufacturing, and the low power base station device 100 is connected to the staging server 210 via the Internet 200. The low power base station device 100 transmits a signal including the MAC address and the serial number (hereinafter, referred to as a "staging server request") to the staging server 210 (S102).

If the low power base station device 100 is installed at the place of the position information, the staging server 210 receives the staging server request from the low power base station device 100. The staging server 210 acquires the MAC address and the serial number from the staging server request, and transmits a signal for requesting verification of the MAC address and the serial number (hereinafter, referred to as a "verification request") to the OSS 370 (S104). This corresponds to requesting confirmation as to whether the low power base station device 100 that has transmitted the staging server request is a valid device.

Upon receiving the verification request from the staging server 210, the OSS 370 executes verification for the MAC address and serial number included in the verification request (S106). For example, if the MAC address and the serial number included in the verification request match the MAC address and serial number included in the information about the low power base station device 100 received from the BSS 360, the OSS 370 determines that the verification is successful. If the verification is successful, the OSS 370 transmits a verification response including an FQDN of the security GW 300 and an FQDN of the EMS 350 to the staging server 210 (S108). When the FQDN of the security GW 300 is referred to as third identification information, the FQDN of the EMS 350 is referred to as fourth identification information. In contrast, if the MAC address and the serial number included in the verification request does not match the MAC address and serial number included in the information about the low power base station device 100 received from the BSS 360, the OSS 370 determines that the verification has failed. If the verification fails, the OSS 370 transmits a verification response indicating the verification failure to the staging server 210.

If receiving the verification response including the FQDN of the security GW 300 and the FQDN of the EMS 350, the staging server 210 transmits the staging server response including the FQDN of the security GW 300 and the FQDN of the EMS 350 to the low power base station device 100 (S110). As a result, the low power base station device 100 acquires the FQDN of the security GW 300 and the FQDN of the EMS 350 as detailed information about the network. When the low power base station device 100 uses the FQDN of the security GW 300, the security GW 300 establishes an IPsec tunnel with the low power base station device 100 (S112). At that time, a vendor certificate of the low power base station device 100 is used.

When the IPsec tunnel is established between the low power base station device 100 and the security GW 300, the CA server 310 registers the low power base station device 100 by a mobile network operator certificate. Thus, instead of the IPsec tunnel established by the vendor certificate, an IPsec tunnel by the mobile network operator certificate is created. Name resolution is performed between the low power base station device 100 and the DNS 340 (S114).

The low power base station device 100 transmits a power on notification issued when the low power base station device 100 is powered on to the received FQDN of the EMS 350 as a destination (S116). The power on notification includes the MAC address and the serial number of the low power base station device 100. Return to FIG. 1.

(3) Processing after Transmitting Power on Notification of Low Power Base Station Device 100

The EMS 350 receives the power on notification from the low power base station device 100 via the IPsec tunnel. As described above, the power on notification includes the MAC address and the serial number of the low power base station device 100, but may include other information. (A) A MAC address of an optical network unit (ONU) or a BBR may be included. (B) Adjacent cell information may be included. (C) ECI information may be included. This is 28-bit long eNodeB ID information. (D) PLMN information may be included. The PLMN information is information for identifying a mobile network operator. (E) A PCI may be included. The PCI is dynamic information, and may change with time for radio frequency (RF) optimization. (F) Reference signal received power (RSRP) may be included. (G) An E-UTRA absolute radio frequency channel number (EARFCN) may be included. The EMS 350 transmits the power on notification to the OSS 370.

Figure 5:
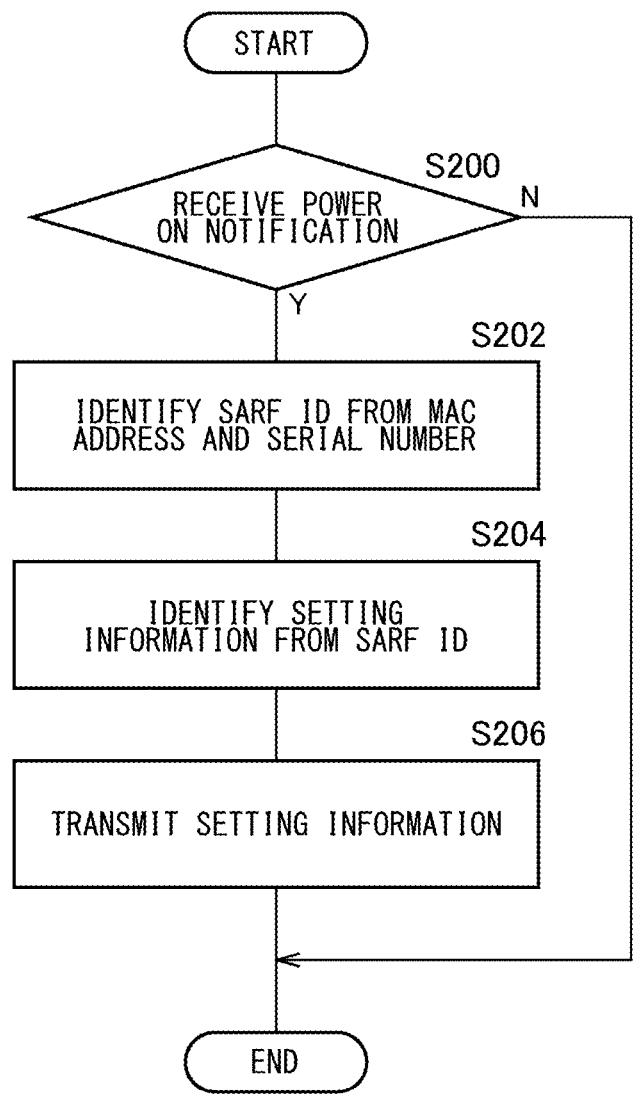
FIG. 5 is a flowchart illustrating a transmission procedure of setting information by an OSS of FIG. 1.

The OSS 370 receives the power on notification from the EMS 350. FIG. 5 is also used herein to describe the processing in the OSS 370. FIG. 5 is a flowchart illustrating a transmission procedure of setting information by the OSS 370. If the OSS 370 receives the power on notification (Y in S200), the OSS 370 acquires the MAC address and the serial number from the power on notification, and identifies the SARF ID from the MAC address and the serial number by referring to the first correspondence relationship (S202). The OSS 370 identifies the setting information from the SARF ID by referring to the second correspondence relationship (S204). The OSS 370 transmits the setting information to the low power base station device 100 (S206). If the OSS 370 does not receive the power on notification (N in S200), the processing ends. As described above, the OSS 370 identifies the SARF ID from the MAC address and the serial number included in the power on notification received from the EMS 350, identifies the setting information from the SARF ID, and transmits the setting information to the low power base station device 100. Return to FIG. 1.

Upon receiving the power on notification, the OSS 370 selects whether to create a new vCU 380 for the low power base station device 100 or to allocate an existing vCU 380 to the low power base station device 100. If a new vCU 380 is needed, the OSS 370 notifies the NSO 330 of the need for a new vCU 380. The NSO 330 instructs a virtual machine (VM) to manage the ESC 332. Under the instruction, a space is allocated to the new vCU 380 to deploy one virtual machine that can host a vCU application.

Based on the instruction received from the NSO 330 regarding the space and VM configuration, the virtual machine is deployed. The vCU application is loaded to operate the service. It is informed to the OSS 370 through the NSO 330. When the vCU 380 is developed and executed, the EMS 350 transmits an FQDN of the vCU 380 to the low power base station device 100. This processing establishes an E2E data communication path.

Upon receiving the setting information from the OSS 370, the low power base station device 100 executes setting by writing the setting information therein. When the setting is completed, the low power base station device 100 permits radio wave radiation from an antenna and executes wireless communication with a mobile terminal. Thereafter, the low power base station device 100 executes processing as a known femtocell. For example, communication data received from the low power base station device 100 and the mobile terminal is transmitted to the vCU 380 via the Internet 200. The communication data transmitted to the vCU 380 is transmitted to the core network system 400.

(4) Modification

As described above, upon receiving the verification request from the staging server 210, the OSS 370 executes verification for the MAC address and serial number included in the verification request, and if the verification is successful, the OSS 370 transmits the verification response including the FQDN of the security GW 300 and the FQDN of the EMS 350 to the staging server 210. Here, a plurality of the security GWs 300 and the EMSs 350 may be placed. For example, a security GW 300 to be in charge of eastern Japan (hereinafter, referred to as a "security GW 300 for eastern Japan") and an EMS 350 to be in charge of eastern Japan (hereinafter, referred to as an "EMS 350 for eastern Japan") are placed, and a security GW 300 to be in charge of western Japan (hereinafter, referred to as a "security GW 300 for western Japan") and an EMS 350 to be in charge of western Japan (hereinafter, referred to as an "EMS 350 for western Japan") are placed. When eastern Japan is referred to as a first region, western Japan is referred to as a second region. When the security GW 300 for eastern Japan is referred to as a first security GW 300 and the EMS 350 for eastern Japan is referred to as a first EMS 350, the security GW 300 for western Japan is referred to as a second security GW 300 and the EMS 350 for western Japan is referred to as a second EMS 350.

Figure 6:
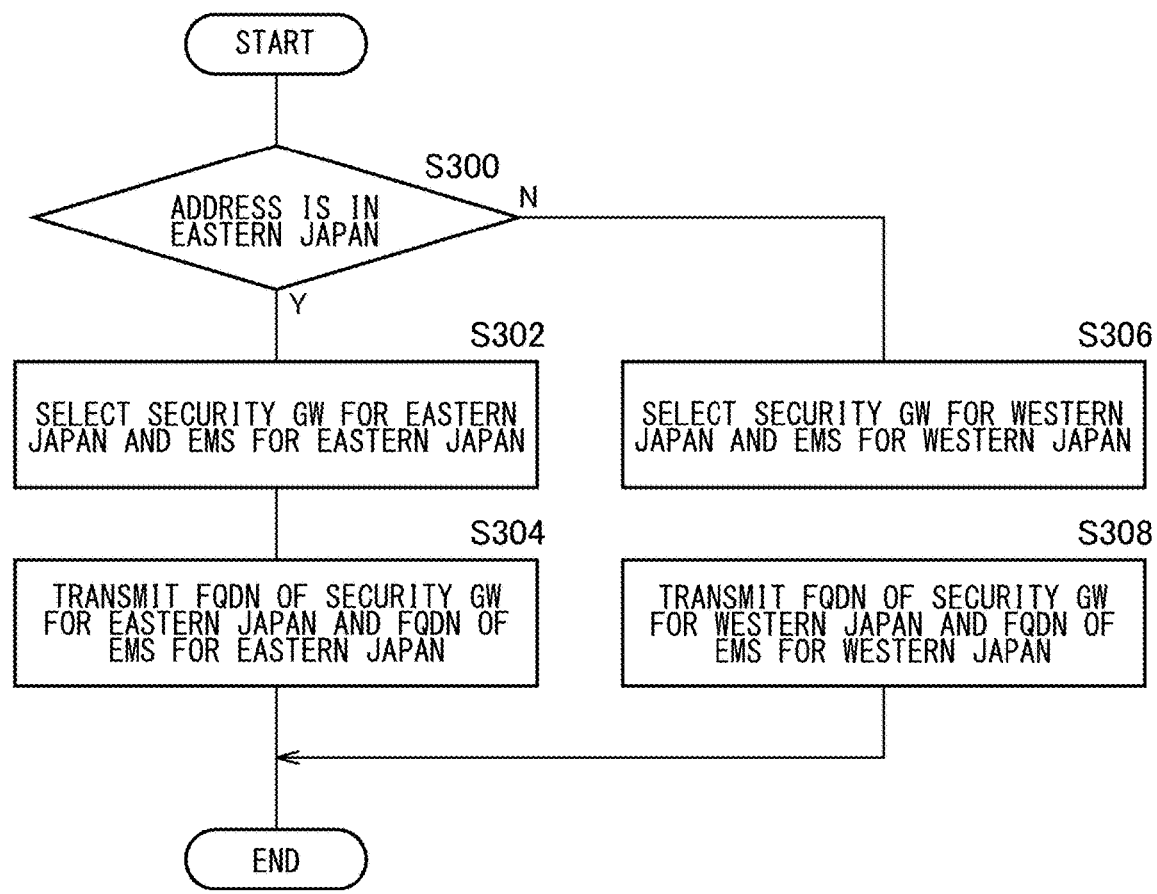
FIG. 6 is a flowchart illustrating a transmission procedure of FQDNs of a security GW and an EMS by the OSS of FIG. 1.

FIG. 6 is also used herein to describe the processing by the OSS 370 in the modification. FIG. 6 is a flowchart illustrating a transmission procedure of FQDNs of the security GW 300 and the EMS 350 by the OSS 370. If an address corresponding to the MAC address and serial number included in the verification request is included in eastern Japan (Y in S300), the OSS 370 selects the security GW 300 for eastern Japan and the EMS 350 for eastern Japan (S302). The OSS 370 transmits a verification response including an FQDN of the security GW 300 for eastern Japan and an FQDN of the EMS 350 for eastern Japan to the low power base station device 100 (S304). If the address included in the verification request is not included in eastern Japan (N in S300), the OSS 370 selects the security GW 300 for western Japan and the EMS 350 for western Japan (S306). The OSS 370 transmits a verification response including an FQDN of the security GW 300 for western Japan and an FQDN of the EMS 350 for western Japan to the low power base station device 100 (S308).

This configuration can be realized by a central processing unit (CPU), a memory, or other large scale integration (LSI) of an arbitrary computer in terms of hardware, and is realized by a program loaded in the memory or the like in terms of software, but here, functional blocks realized by cooperation thereof are illustrated. Therefore, it is understood by those skilled in the art that these functional blocks can be realized in various forms by hardware alone or a combination of hardware and software.

According to the this example, the second identification information is generated from the first identification information before shipment, the setting information is generated in association with the second identification information, and if verification of the power on notification received after shipment is successful, the second identification information and the setting information are identified from the first identification information included in the power on notification, and the setting information is written in the low power base station device, so that the setting for the low power base station device can be simplified. In addition, since the second identification information is generated from the first identification information and the setting information is generated in association with the second identification information, even if the low power base station device is changed before shipment, it is only necessary to change the first correspondence relationship between the first identification information and the second identification information while leaving the second identification information as it is. Furthermore, since it is only necessary to change the first correspondence relationship between the first identification information and the second identification information while leaving the second identification information as it is, the processing can be simplified. Since the security GW and the EMS are switched and used according to the position information, the processing amounts of the security GW and the EMS can be smoothed.

Since the setting for the low power base station device is automatically performed, operation by a worker can be made unnecessary. In addition, since the operation by a worker is unnecessary, a period until the low power base station device is installed can be shortened. Furthermore, since the processing in the low power base station device is automated and captured by the OSS, even if a failure or a problem occurs, a worker can receive a warning and take a necessary measure.

The present disclosure has been described above based on the examples. It will be understood by those skilled in the art that the examples are illustrative, that various modifications may be made to combinations of the components or processing processes thereof, and that such modifications are also intended to fall within the scope of the present disclosure.

INDUSTRIAL APPLICABILITY

According to the present invention, setting for a low power base station device can be simplified.

The invention claimed is:

1. A setting system comprising:
a business support system, an operation support system, and an element management system placed in a mobile network operator's network;
a staging server placed outside the mobile network operator's network; and
a gateway placed at a boundary between the mobile network operator's network and the outside,
wherein the business support system receives first identification information written in a base station device to be shipped and position information of a place where the base station device is installed;
the operation support system generates second identification information from the first identification information received in the business support system and generates setting information of the base station device based on the second identification information while reflecting the position information received in the business support system;
when the base station device is installed in the place of the position information, the staging server receives the first identification information from the base station device;
when verification of the first identification information received in the staging server is successful, the operation support system transmits third identification information of the gateway and fourth identification information of the element management system to the base station device via the staging server;
the gateway establishes an IPsec tunnel with the base station device that has received the third identification information from the operation support system;
the element management system receives from the base station device via the IPsec tunnel established at the gateway, a power on notification issued when the base station device is powered on and including the first identification information; and
the operation support system identifies the second identification information from the first identification information included in the power on notification received by the element management system, identifies the setting information from the second identification information, and writes the setting information in the base station device.

2. The setting system according to claim 1, wherein the element management system comprises a first element management system to be in charge of a first region; and a second element management system to be in charge of a second region that is different from the first region,
the gateway comprises a first gateway to be in charge of the first region; and a second gateway to be in charge of the second region, and
when verification of the first identification information received in the staging server is successful, the operation support system transmits third identification information of the first gateway and fourth identification information of the first element management system to the base station device via the staging server if the position information received in the business support system is included in the first region, and transmits third identification information of the second gateway and fourth identification information of the second element management system to the base station device via the staging server if the position information received in the business support system is included in the second region.

3. The setting system according to claim 1, wherein the first identification information is a MAC address and a serial number,
the second identification information is a SARF ID,
the third identification information is an FQDN, and
the fourth identification information is an FQDN.

4. A setting method in a setting system comprising:
a business support system, an operation support system, and an element management system placed in a mobile network operator's network; a staging server placed outside the mobile network operator's network; and a gateway placed at a boundary between the mobile network operator's network and the outside, the method comprising the steps of:
the business support system receiving first identification information written in a base station device to be shipped and position information of a place where the base station device is installed;
the operation support system generating second identification information from the first identification information received in the business support system and generating setting information of the base station device based on the second identification information while reflecting the position information received in the business support system;
when the base station device is installed in the place of the position information, the staging server receiving the first identification information from the base station device;
when verification of the first identification information received in the staging server is successful, the operation support system transmitting third identification information of the gateway and fourth identification information of the element management system to the base station device via the staging server;
the gateway establishing an IPsec tunnel with the base station device that has received the third identification information from the operation support system;
the element management system receiving from the base station device via the IPsec tunnel established at the gateway, a power on notification issued when the base station device is powered on and including the first identification information; and
the operation support system identifying the second identification information from the first identification information included in the power on notification received by the element management system, identifying the setting information from the second identification information, and writing the setting information in the base station device.

* * * * *